United States Patent [19]

Pearson et al.

[11] Patent Number: 4,771,921

[45] Date of Patent: Sep. 20, 1988

[54] CONVERSION KIT TO ADAPT A SINGLE-FEED CONTINUOUS FORM PRESS TO DUAL-FEED OPERATION

[75] Inventors: Bernard A. Pearson, Normandie Park; John W. Jacob, King County, both of Wash.

[73] Assignee: Norfin International, Inc., Seattle, Wash.

[21] Appl. No.: 49,619

[22] Filed: May 13, 1987

[51] Int. Cl.[4] .................. G03B 1/22

[52] U.S. Cl. .................. 226/74

[58] Field of Search .................. 226/74, 75; 400/616, 400/616.1, 616.2, 616.3, 588, 584, 585, 609; 101/228

[56] References Cited

U.S. PATENT DOCUMENTS

| | | | |
|---|---|---|---|
| 2,012,282 | 8/1935 | Metzner | 400/616.3 |
| 2,047,233 | 7/1936 | Sherman | 400/616.3 |
| 3,687,347 | 8/1972 | Rod et al. | 226/74 |

FOREIGN PATENT DOCUMENTS

| | | | |
|---|---|---|---|
| 475927 | 11/1937 | United Kingdom | 400/616.3 |

*Primary Examiner*—John Petrakes
*Assistant Examiner*—Lynn M. Sohacki
*Attorney, Agent, or Firm*—Seed and Berry

[57] ABSTRACT

A conversion kit to adapt a single-feed continuous form paper press to dual-feed continuous form paper operation and thereby double production capacity. The kit includes infeed and outfeed bars which are attachable by their ends to corresponding pairs of drive pins of the infeed and outfeed tractors. Each of the bars is provided with a centrally located drive pin to project through overlapping perforated edge portions of both of the continuous form papers being printed. Infeed and outfeed support arms are provided which support infeed and outfeed guides. The guides are movable into and out of position over the centrally located drive pins of the infeed and outfeed bars to maintain the overlapping perforated edge portions of the papers entrained on the centrally located drive pins. The infeed and outfeed bars are provided with an aperture in each end portion which receives a corresponding one of the tractor drive pins, and a lock member is attached to each of the bar end portions to clamp the bar ends to the endless belt of the corresponding tractor. A supplemental paper collection tray is included to be positioned rearward of the main tray to permit the overlapping perforated edge portions to separate. A guide guides the rightmost continuous form paper to the supplemental tray.

28 Claims, 3 Drawing Sheets

FIG. 7
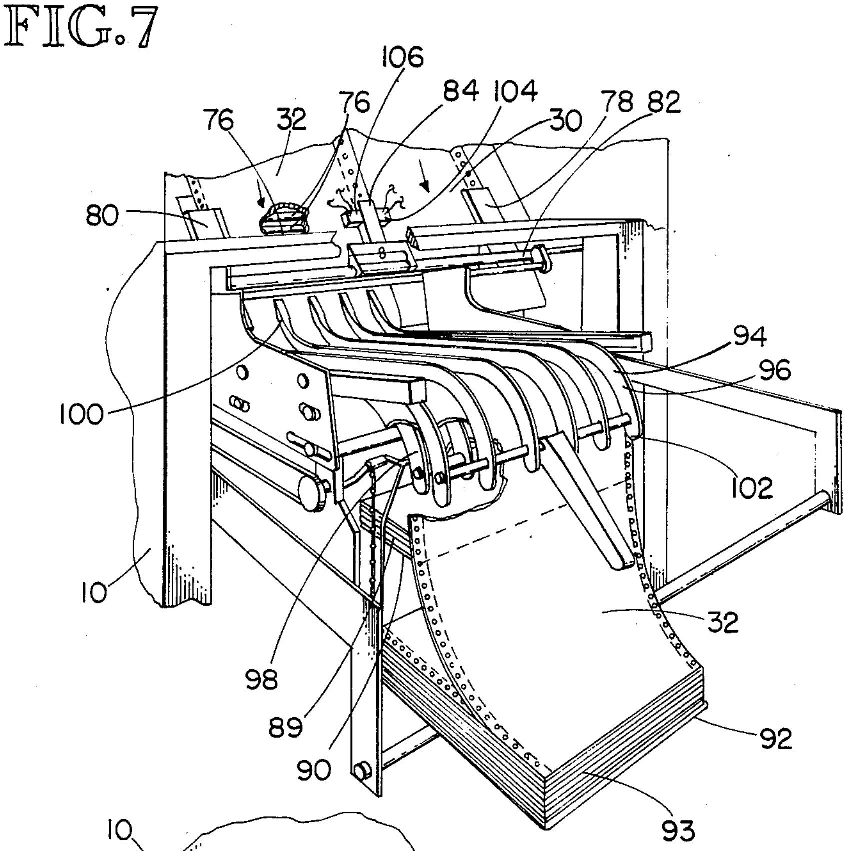
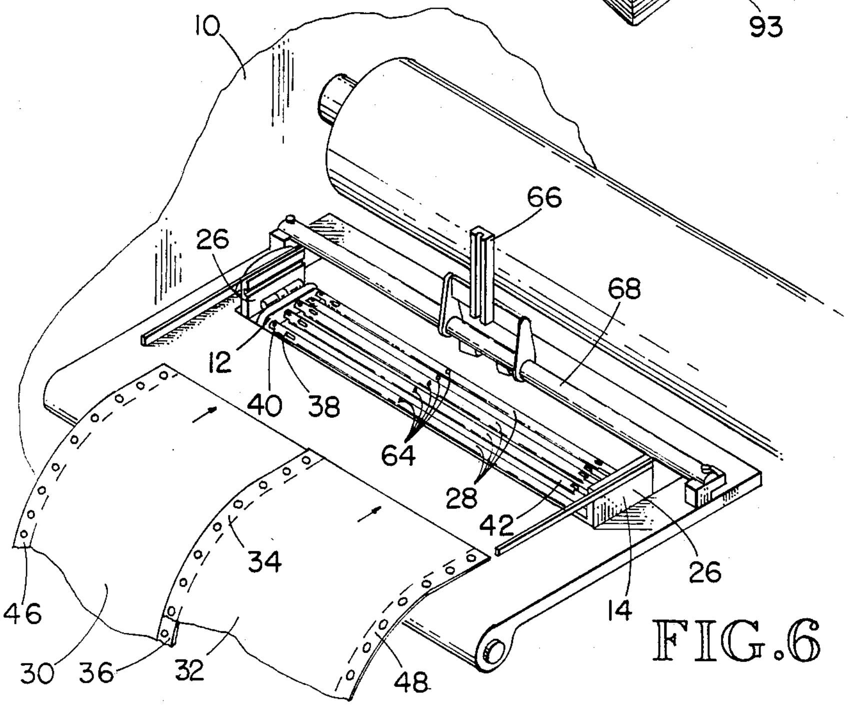
FIG. 6

CONVERSION KIT TO ADAPT A SINGLE-FEED CONTINUOUS FORM PRESS TO DUAL-FEED OPERATION

TECHNICAL FIELD

The present invention relates generally to printing presses, and more particularly, to a conversion kit and method of conversion to adapt a single-feed continuous form paper press to dual-feed continuous form paper operation.

BACKGROUND OF THE INVENTION

Single-feed continuous form paper presses generally have left and right side infeed and outfeed tractors which are laterally adjustable to accommodate the varying widths of continuous form paper for which the press was designed. Generally, such presses allow the lateral separation of the tractors to positions sufficient to accommodate paper with a width for printing of up to 17.4 inches. These presses are usually provided with a single collection tray positioned below the outfeed tractors onto which the continuous form paper is folded at its transverse slit perforations.

The press is designed to feed a single continuous form paper having left and right side perforated edge portions. The left and right infeed and outfeed tractors are positioned so that a plurality of drive pins which are connected to a driven endless belt of each tractor will extend through the corresponding perforated edge portion of the continuous form paper. As is convention, the left and right edge portions of the continuous form paper are intended to be detached and the individual sheets which comprise the continuous form paper are intended to be separated at the transverse perforations by the printer or the user after the printing process is complete.

While only a single continuous form paper can be printed at one time, the printing rollers and other components of the presses are frequently of sufficient length so as to accommodate continuous form paper having a width for printing greater than the typical 8.5 inch width continuous form papers used for many forms.

It will therefore be appreciated that there is a significant need for a conversion kit to allow single-feed continuous form paper presses to simultaneously print two continuous form papers, thereby doubling the printing capacity of the presses. The conversion kit should be relatively inexpensive and easy to install on existing single-feed continuous form paper presses. Once the conversion kit is installed, the press should be able to print and transport simultaneously two continuous form papers and deposit each in folded manner on an outfeed collection tray, without the one continuous form paper interfering with the other. Moreover, the conversion kit once installed should still permit the operation of the press with a single continuous form paper when desired. The present invention fulfills this need, and further provides other related advantages.

DISCLOSURE OF THE INVENTION

The present invention resides in a kit to adapt a single-feed continuous form paper press having left and right side infeed and outfeed tractors to dual-feed continuous form paper operation. With such a press, the position of each infeed tractor is laterally adjustable and each tractor has a plurality of drive pins connected to a driven endless belt for projecting through a corresponding pref
orated left or right edge portion of a single continuous form paper.

In the presently preferred embodiment of the invention a plurality of infeed bars are provided. Each infeed bar has a length sufficient to span the combined width of a leftmost continuous form paper and a rightmost continuous form paper positioned side-by-side. Because of the limited width of printing certain presses can handle, the infeed bars span a distance determined with a perforated edge portion of one of the leftmost to rightmost continuous form papers overlaying the adjacent perforated edge portion of the other. Each of the infeed bars has a left endless belt at the location of one of the left side infeed tractor drive pins. The infeed bar also has a right end with a right end means for attachment to the right side infeed endless belt at the location of the corresponding one of the right side infeed tractor drive pins. In the preferred embodiment of the invention, the left end and right end means for attachment include a left end aperture through the left end of the infeed bar and a right end aperture through the right end of the infeed bar, both sized to receive the corresponding one of the left or right side infeed tractor drive pins.

The infeed bar is positioned transverse to the flow of the leftmost and rightmost continuous form papers with the left and right bar ends being in driven engagement with the corresponding left or right side infeed endless belt to provide drive to the infeed bar in the direction of paper flow. The left and right bar ends are positioned to avoid interference with the left and right side infeed tractor drive pins. In the presently preferred embodiment, this is accomplished by making the left and right bar ends sufficiently thin to permit the left and right infeed tractor drive pins to protrude outward sufficiently beyond the left and right bar ends to project through the corresponding perforated left or right edge portion of the leftmost or rightmost continuous form papers, respectively.

Each of the infeed bars further includes a centrally located drive pin means attached thereto for projecting through the perforated edge portions of both the leftmost and rightmost continuous form papers. For the presses with narrow printing width, the drive pin means is a single drive pin fixedly attached to the infeed bar to project through the overlapping perforated edge portions of the leftmost and rightmost continuous form papers simultaneously. When the infeed bars are installed on the press, the centrally located drive pins are in alignment with the direction of paper flow.

The conversion kit further includes means for locking the infeed bar left end to the left side infeed endless belt, and means for locking the infeed bar right end to the right side infeed endless belt. In the preferred embodiment of the invention, the infeed bars are locked to the infeed tractor with the left side infeed tractor drive pin in position in the left end aperture, and with the corresponding right side infeed tractor drive pin in position in the right end aperture.

The conversion kit has an infeed support arm attachable by at least one end to a stationary portion of the press. The infeed support arm has a length sufficient to project to a position generally above the centrally located drive pins. In the preferred embodiment of the invention, the length is sufficient to span the width of the side-by-side leftmost and rightmost continuous form papers and is attached at both ends to the press.

An infeed guide is supported by the infeed support arm above the centrally located drive pins of the infeed bars and is movable into and out of a guide position. When in the guide position, the infeed guide is positioned to maintain the overlapping perforated edge portions of both the leftmost and rightmost continuous form papers engaged by a plurality of the centrally located drive pins of the infeed bars.

The conversion kit can further include a plurality of outfeed bars similar in construction to the infeed bars. The outfeed bars are attached to the left and right side outfeed tractor drive pins in the same manner as described above for the infeed bars. An outfeed support arm is also provided of similar construction to the infeed support arm and supports an outfeed guide above the centrally located drive pins of the outfeed bars.

The conversion kit can further include a supplemental collection tray positioned rearward of a main collection tray of the press by a sufficient distance to permit the leftmost or rightmost continuous form paper overlaying the other to separate form the other for folding on the supplemental tray, uninihbited by the continuous form paper being folded on the main tray.

To guide the continuous form paper to the supplemental tray an outfeed paper transport guide is provided and is attachable to a stationary portion of the press. The outfeed paper transport guide is positionable at the left to right side of the press at which the supplemental tray is positioned. The outfeed paper transport guide extends rearwardly from the location of the outfeed tractors to above the supplemental tray whereat the continuous form paper being guided is released for folding onto the supplemental tray. The supplememtal tray has a width of about the width of the continuous form paper to be folded thereon, and thereby access from the rearward side of the press is not blocked to the portion of the main tray on which the other continuous form paper is folded.

In the preferred embodiment of the invention, the means for locking the infeed and outfeed bar ends to the left and right side infeed tractors include left and right members attachable to the left and right ends, respectively, of each bar. The left or right member extends from its point of attachment to the bar to a position generally under a corresponding clamping end portion of the left or right bar end. The clamping portion of the bar is positionable to one side of the corresponding endless belt of the tractor with the left or right member on the other side of the belt. The conversion kit further includes means for attaching the left and right members to the infeed bar, and for applying a clamping force between the clamping end portion of the bar and the left or right member to clamp the endless belt therebetween.

Other features and advantages of the invention will become apparent from the following detailed description, taken in conjunction with the accompanying drawings.

BRIEF DESCRIPTION OF THE DRAWINGS

FIG. 6 is an isometric view similar to FIG. 3 showing the two continuous form papers positioned prior to engagement with the infeed bars.

FIG. 7 is an enlarged, fragmentary rear isometric view of the press shown in FIG. 2, partially showing the outfeed bars, and showing the paper transport guide and the main and supplemental outfeed paper collection trays.

BEST MODE FOR CARRYING OUT THE INVENTION

Figure 1:
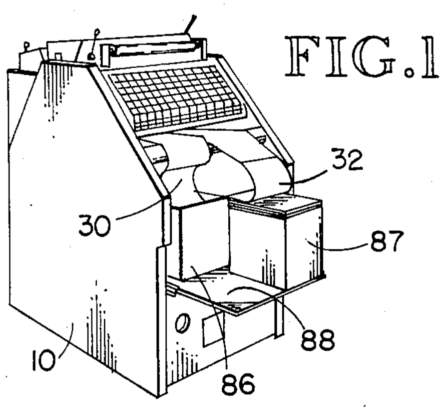
FIG. 1 is a frontal isometric view of a single-feed continuous form paper press which has been converted to dual-feed continuous form paper operation using the conversion kit of the present invention.

As shown in the drawings for purposes of illustration, the present invention is embodied in a conversion kit used to adapt a single-feed continuous form paper press 10 to dual-feed continuous form paper operation. The press 10 shown in the drawings is model number R-14 CS-2 shortrun forms press manufactured by Rotaprint GMBH of West Germany and has a width for printing of 17.4 inches. This width is sufficient to run a single continuous form paper having a typical printing width of 8.5 inches. Such size paper also has a one-half inch perforated edge portion along both side edges, making a total overall width of 9.5 inches. The press 10 is not sufficiently wide to accommodate two such continuous form papers positioned side-by-side since this would require a printing width of 18 inches (i.e., 17 inches for the combined printing surface of both papers and 1.0 inch for two side-by-side perforated edge portions—the right side perforated edge portion of the leftmost continuous form paper and the left side perforated edge portion of the rightmost continuous form paper which would occupy a width of one inch in the middle of the press).

Even presses with larger printing widths, while perhaps having enough width to handle two continuous form papers side-by-side, cannot print in a dual-feed mode since they are originally designed only for use with a single continuous form paper. The large printing width is provided only so that a single continuous form paper can be printed of any width up to the maximum premitted by the press.

Figure 4:
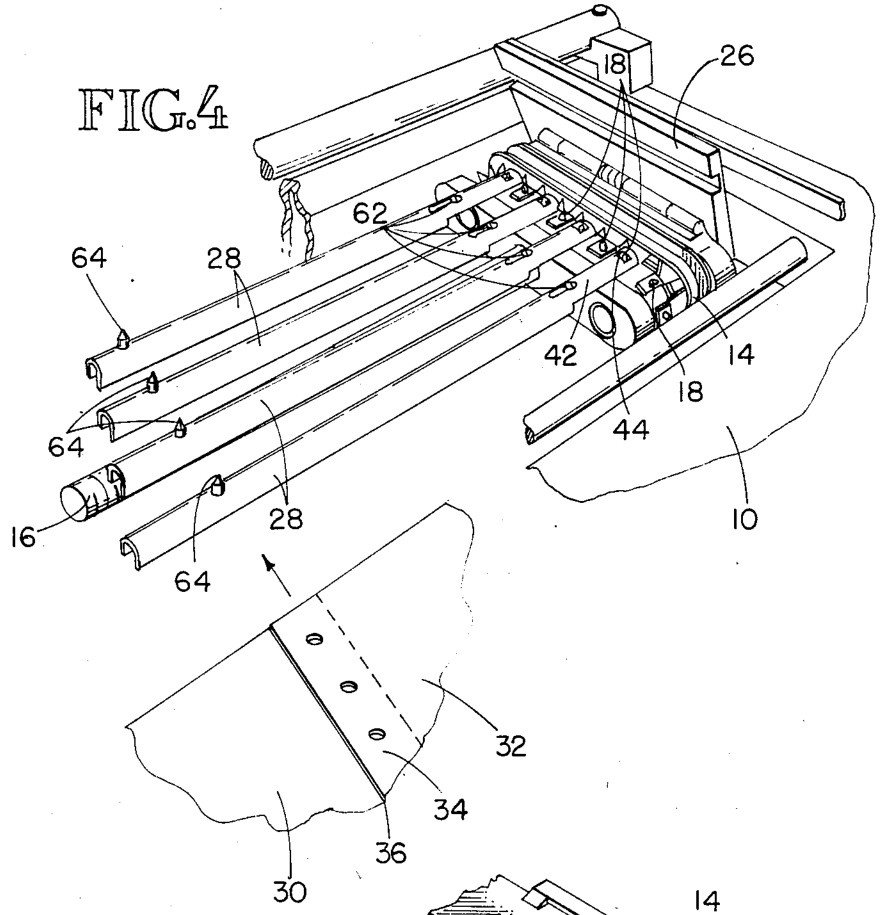
FIG. 4 is an enlarged, fragmentary sectional view of the paper infeed area of FIG. 3, showing only four of the infeed bars in position on the right side infeed tractor and showing the continuous form papers positioned ready for feeding to the infeed bars.

To accommodate the various widths of continuous form paper to be run on the press 10, the press has left and right side infeed tractors 12 and 14, respectively. The position of each infeed tractor is laterally adjustable, and as shown in FIG. 4, the infeed tractors move laterally on an adjustment bar 16. Each of the infeed tractors 12 and 14 has a plurality of drive pins 18 connected to an infeed driven endless belt 20 for projecting through a corresponding perforated left or right edge portion of a single continuous form paper.

Figure 5:
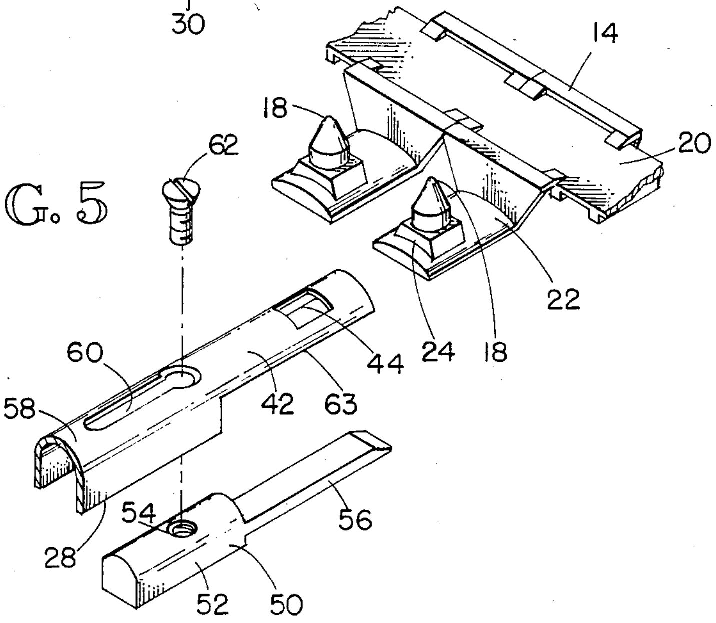
FIG. 5 is an enlarged, fragmentary sectional view of the right end portion of one infeed bar prior to clamping onto a corresponding drive pin of the right side tractor.

As best shown in FIG. 5, the infeed tractor endless belts 20 each include a plurality of laterally inward projecting tab portions 22 to which one of the drive pins 18 is connected. The drive pin 18 is attached to the tab portion 22 by a quadrilaterally shaped pin base 24. Each tractor includes a hinged guide plate 16 which is movable into a guide position over the tractor pins 18 to maintain the perforated edge portion of the continuous form paper entrained on a plurality of the drive pins.

In accordance with the present invention, the conversion kit includes a plurality of rigid infeed bars 28. The number provided is sufficient to connect one bar 28 between every other corresponding pair of left and right side infeed tractor drive pins 18. Each of the infeed bars 28 is of a length sufficient to span the combined width of a leftmost continuous form paper 30 and a rightmost continuous form paper 32 positioned generally side-by-side in a manner which will be described below. With the press 10 shown in the drawings, to accommodate the limited printing width available it is necessary to position the leftmost and rightmost continuous form papers 30 and 32 generally side-by-side with a perforated left side edge portion 34 of the rightmost continuous form paper 32 overlaying the adjacent right side perforated edge portion 36 of the leftmost continuous form paper 30. This provides a printing width of about 17.5 inches which is sufficiently narrow to run on the press with a 17.4 inch width. The order of overlaying of the left and right side perforated edge portions could, of course, be reversed if desired and certain other modifications were made to the outfeed portions of the conversion kit described below.

Each of the infeed bars 28 has a left end portion 38 with a left end aperture 40 therethrough sized to receive one of the left side infeed tractor drive pins 18. Similarly, and as best shown in FIG. 5, each of the infeed bars 28 also has a right end portion 42 with a right end aperture 44 therethrough sized to receive one of the right side infeed tractor drive pins 18 which corresponds in position along the endless belt 20 to the left side tractor drive pin received in the left end aperture 40. Both the left and right end apertures 40 and 44 have a quadrilateral shape to snuggly receive the pin base 24 of the drive pin 18 therein and thereby lock the infeed bar against rotation relative to the infeed tractors 12 and 14.

When all of the infeed bars 28 are connected between corresponding pairs of left and right side infeed tractor drive pins 18, the infeed bars are positioned transverse to the flow of the leftmost and rightmost continuous form papers 30 and 32, with the left and right bar end portions 38 and 42 being in driving engagement with the infeed tractor drive pins. This provides drive to the infeed bars in the direction of paper flow. The left and right end portions 38 and 42 of each infeed bar 28 is sufficiently thin and shaped to permit the infeed tractor drive pins 18 received in the left and right end bar apertures 40 and 44 to protrude outward sufficiently beyond the left and right bar end portions to project through a corresponding perforated left edge portion 46 of the leftmost continuous form paper 30 and a corresponding perforated right edge portion 48 of the rightmost continuous form paper 32. The infeed bar 28 has a cross-sectional U-shape to provide rigidity to the bar, and has a rounded, smooth exterior surface portion 58 positioned for contact with the continuous form papers 30 and 32.

The conversion kit of the present invention also includes a plurality of lock members 50 for attachment to each of the left and right end portions 38 and 42 of the infeed bars 28. As best shown in FIG. 5, each lock member 50 has a body portion 52 with a threaded bore 54 therein, and a finger portion 56 projecting from the body portion transverse to the axis of the threaded bore 54. The body portion 52 is sized to fit within the U-shaped concavity of the infeed bar 28 toward the left or right bar end portion 38 and 42 at which the lock member 50 is being attached. An elongated slot 60 is provided in the infeed bar 28 at its end portion, and has a width sufficient to allow passage of the threaded shank of a screw 62 freely therethrough. With the lock member 50 in position within the infeed bar 28 and the threaded bore 54 aligned with the slot 60, the screw 62 is threaded into the bore for a loose fit. The lock member 50 can then be slidably retracted toward the center of the infeed bar 28 to move the finger portion 56 toward the center and clear of the left or right end portion 38 or 42 of the infeed bar at which attached and free of the left or right end aperture 40 or 44. This permits easy placment of the left or right bar end portion over the tractor guide pin 18 which it is to receive.

When the infeed bar 28 is in position with the tractor guide pin 18 protruding through the left or right end aperture 40 or 44, the lock member 50 can be slid toward the guide pin to position the finger portion 56 under the tab portion 22 which supports the guide pin and opposite the left or right bar end portion. When in this position, the body portion 52 of the lock member 50 will be at an end of the slot 60 toward the guide pin and whereat the slot has been countersunk to receive the head portion of the screw 62. The screw 62 is then turned to tightly thread the screw into the bore hole 54 of the lock member body portion 52 and thereby clamp the tab portion 22 of the tractor endless belt 20 between the left or right end portion 38 or 42 of the infeed bar 28 and the finger portion 56 of the lock member 50. A sufficient clamping force is provided to keep the infeed bar 28 firmly attached to the tractor endless belt 20. To facilitate a better fit of the infeed bar 28 to the tab portion 22, the left and right bar end portions 38 and 42 are cut away along a portion 63 of their length. When the screw 62 is fully seated, the head portion of the screw is generally flush with the exterior surface portion 58 of the infeed bar.

In the presently preferred embodiment of the invention shown in the drawings, each infeed bar 28 further includes a centrally located drive pin 64 fixedly attached thereto and projecting away from the exterior surface portion 58 of the infeed bar to project fully through the overlapping perforated edge portions 34 and 36 of both the leftmost and rightmost continuous form papers 30 and 32. When the infeed bars 28 are installed on the press 10, the centrally located drive pins 64 are in alignment with the direction of paper flow and provide drive to both of the papers.

Included in the conversion kit is an infeed guide 66 and an infeed support arm 68 for supporting the infeed guide. Much like with the tractor guide plates 26 of the left and right infeed tractors 12 and 14, the infeed guide 66 is movable into an out of a guide position whereat the infeed guide is positioned to maintain the overlapping perforated edge portions 34 and 36 of both the leftmost and rightmost continuous form papers 30 and 32 engaged by a plurality of the centrally located drive pins 64 of the infeed bars 28. The support arm 68 has a length sufficient to span the entire width of the side-by-side continuous form papers 30 and 32 and extend therebeyond. The support arm 68 has left and right end portions 70 and 72, respectively, which are fixedly attached to stationary portions of the press 10. The infeed guide 66 is rotatably supported on the support arm 68 along a central portion thereof generally above the overlapping perforated end portions 34 and 36 of the continuous form papers 30 and 32.

The conversion kit further includes outfeed bars 76, as shown in FIG. 7, having an identical design to the infeed bars 28 described above. In the same manner as with the infeed bars 28, the outfeed bars 76 are attached to left and right side outfeed tractors 78 and 80. The position of each outfeed tractor 78 and 80 is laterally adjustable and each outfeed tractor has a plurality of drive pins connected to an outfeed driven endless belt, as with the infeed tractors 12 and 14. In every detail, the outfeed bars 76 are constructed, attached, and locked in position in the same manner as the infeed bars 28. The conversion kit includes an outfeed support arm 82 supporting an outfeed guide 84 having an identical design and mounted in an identical manner as the infeed support arm 68 and the infeed guide 66, so as to maintain the overlapping perforated edge portions 34 and 36 of the leftmost and rightmost continuous form papers 30 and 32 engaged by a plurality of centrally located drive pins on the outfeed bars 76.

In operation, the leftmost and rightmost continuous form papers 30 and 32 are supplied to the press 10 from their respective packing boxes 86 and 87 within which they are shipped, as shown in FIG. 1. The packing box 87 for the rightmost continuous form paper 32 is positioned on an infeed paper support tray 88 forward of the packing box 86 for the leftmost continuous form paper 30, with the left side of the box 87 slightly left of the right side of the box 86 so as to position the rightmost continuous form paper being supplied with its left side edge portion 34 overlapping the right side.edge portion 36 of the leftmost continuous form paper.

Figure 2:
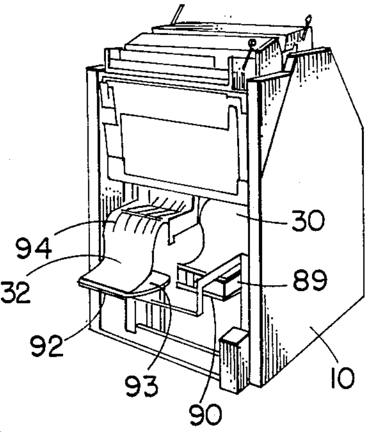
FIG. 2 is a rear isometric view of the outfeed side of the converted press of FIG. 1.
Figure 3:
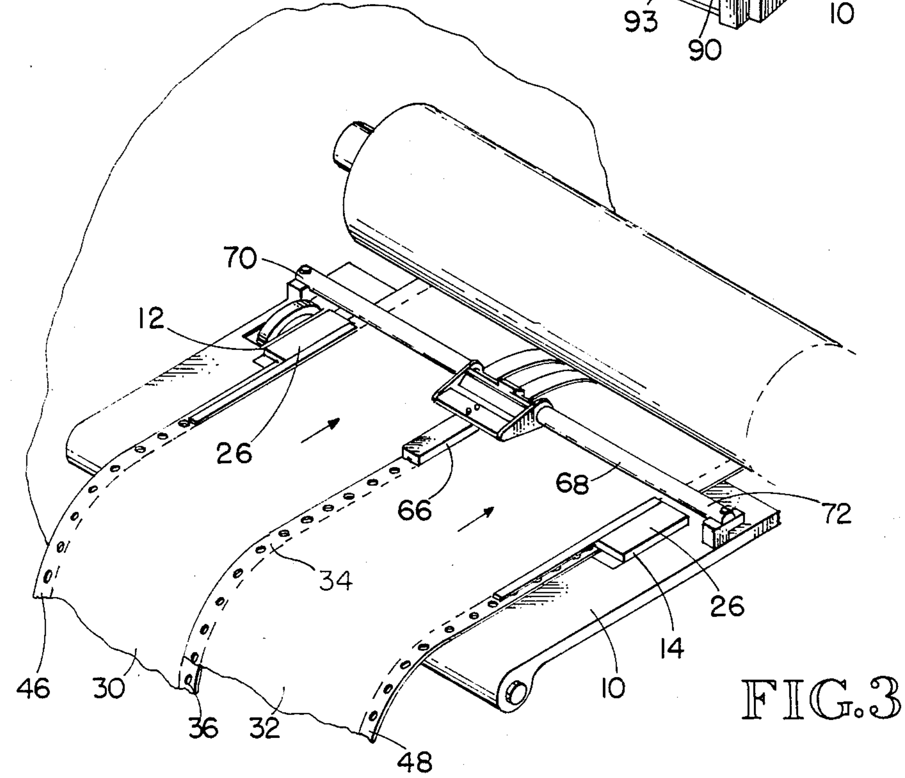
FIG. 3 is an enlarged, fragmentary view of the paper infeed area of the press of FIG. 1 shown in dual-feed operation.

After the leftmost and rightmost continuous form papers 30 and 32 have been printed by the press 10, and are driven past the outfeed tractors 78 and 80 and the outfeed bars 76, the leftmost continuous form paper 30, which has its right side edge portion 36 under the left side edge portion 34 of the rightmost continuous form paper 32, drops generally directly downward and is folded along its transverse slit perforations onto a stack 89 formed on a main outfeed collection tray 90 of the printer 10 shown in FIGS. 2 and 7. The main outfeed collection tray 90 is positioned below the level of the outfeed tractors 78 and 80 of the press 10 to receive and collect the leftmost continuous form paper.

To receive and collect the rightmost continuous feed paper 32, which the conversion kit of the present invention permits to be run simultaneously with the leftmost continuous form paper 30, even though the press 10 is originally designed and manufactured for only a single-feed operation, the conversion kit also includes a supplemental outfeed collection tray 92. The supplemental outfeed collection tray 92 positioned below the level of the outfeed tractors 78 and 80 on the right side of the press 10 rearward of the main collection tray 90 by a sufficient distance to permit the rightmost continuous form paper 32, which has its left side edge portion overlaying the right side edge portion of the leftmost continuous form paper prior to folding on along its transverse slit perforations onto a stack 93 formed on the supplemental tray. In such manner, the folding of the rightmost continuous form paper onto the supplemental tray 92 can be accomplished uninhibited by the leftmost continuous form paper 30 which is being folded onto the main tray 90.

An outfeed paper transport guide 94 is provided in the conversion kit, and as shown in FIG. 7 includes a plurality of S-shaped upper guides 96 and a plurality of similarly shaped lower guides 98. The upper and lower guides 96 and 98 are closely spaced apart from each other to receive the rightmost continuous form paper 32 therebetween and guide the paper without permitting folding of the paper at its transverse perforations. The outfeed paper transport guide 94 is fixedly attached to stationary portions of the press 10 and is positioned at the right side of the press at its outfeed side to receive the rightmost continuous form paper 32 upon release from the right side outfeed tractor 80 and the centrally located drive pins of the outfeed bars 76. The outfeed paper transport guide 94 has a forward up-turned portion to receive the rightmost continuous form paper 32 and a rearward down-turned portion 102 from which the rightmost continuous form paper is discharged above the supplemental outfeed collection tray 92.

It has been found undesirable to provide any mechanically active means for pulling the rightmost continuous form paper 32 through the upper and lower guides 96 and 98 of the outfeed paper transport guide 94. Instead, the transport guide 96 relies upon the pushing force applied to the rightmost continuous form paper by the outfeed tractor 80 and the centrally located drive pins of the outfeed bars 76 to force the paper through the transport guide. To facilitate smooth movement without tearing, folding or kinking of the paper along its transverse perforations, the surfaces of the upper and lower guides 96 and 98 which engage the paper are coated with TEFLON.

The supplemental outfeed collection tray 92 has a width just slightly greater than the overall width of the rightmost continuous form paper 32 to be folded thereon. This is so that neither the stack 89 of folded paper on the supplemental tray 92 not the supplemental tray itself block access from the rearward side of the press 10 to the main tray 90 on which the leftmost continuous form paper 30 is folded into the stack 89.

To detect breakage of the leftmost or rightmost continuous form papers 30 and 32 being printed, a left side electro-optical sensor 104 and a right side electro-optical sensor 106 are attached to the left and right sides, respectively, of the outfeed guide 84. The sensors 104 and 106 detect breakage of either the leftmost or rightmost continuous form papers. If either the leftmost or rightmost continuous form paper 30 or 32 breaks, the corresponding sensor 104 or 106, respectively, provides an indicator signal to the press 10 to cause the press to stop printing.

So as to accommodate situations when the operator of the press 10 might wish to run the press in only a single-feed mode, controls (not shown) are provided to avoid the unused one of the sensors 104 or 106 under which no paper is being passed from causing the press to inappropriately stop printing.

The conversion kit of the present invention is easy and quick to install, and perhaps even more important easy and quick to remove should the printer desire to operate the press 10 with wider continuous form paper than permitted by the infeed and outfeed bars 28 and 76. With the conversion kit described, the printer can make the press 10 ready for such use in about 20 minutes.

To facilitate consistency of description, the left and right sides have been referred to with respect to a person facing the front, infeed side of the printer 10 even when reference is made to components on the rear, outfeed side of the printer.

It will be appreciated that, although specific embodiments of the invention have been described herein for purposes of illustration, the various modifications may be made without departing from the spirit or scope of the invention. Accordingly, the invention is not limited except by the appended claims.

We claim:

1. A conversion kit to adapt a single-feed continuous form paper press having left and right side infeed tractors to dual-feed continuous form paper operation, the position of each infeed tractor being laterally adjustable and each infeed tractor having a plurality of drive pins connected to an infeed driven endless belt for projecting through a corresponding perforated left or right edge portion of a single continuous form paper, comprising:

an infeed bar for every other corresponding pair of left and right side infeed tractor drive pins along the infeed endless belts, each said infeed bar being of a length sufficient to span the combined width of a leftmost continuous form paper and a rightmost continuous form paper positioned side-by-side with a perforated edge portion of one of the leftmost or rightmost continuous form papers overlaying the adjacent perforated edge portion of the other, each said infeed bar having a left end with a left end aperture therethrough to receive the left side infeed tractor drive pin of the corresponding pair of drive pins and a right end with a right end aperture therethrough to receive the right side infeed tractor drive pin of the corresponding pair of drive pins, said infeed bar being positioned transverse to the flow of the leftmost and rightmost continuous form papers with the left and right bar ends being in driving engagement with the left or right side infeed tractor drive pin of the corresponding pair of drive pins to provide drive to said infeed bar in the direction of paper flow, said left and right bar ends being sufficiently thin to permit the left and right side infeed tractor drive pins to protrude outward sufficiently beyond said left and right bar ends to project through the corresponding perforated left or right edge portion of the leftmost or rightmost continuous form papers, respectively, each said infeed bar further including a centrally located drive pin fixedly attached thereto to project through the overlapping perforated edge portions of both the leftmost and rightmost continuous form papers, whereby when said infeed bars are installed on the press, said centrally located drive pins are in alignment with the direction of paper flow;

means for locking each said infeed bar left end to the left side infeed tractor with the left side infeed tractor drive pin in position in said left end aperture;

means for locking each said infeed bar right end to the right side infeed tractor with the right side infeed tractor drive pin in position in said right end aperture;

an infeed support arm having a length sufficient to span the width of the side-by-side leftmost and rightmost continuous form papers and attachable by each end to a stationary portion of the press; and an infeed guide supportable by said infeed support arm above said centrally located drive pins of said infeed bars and movable into and out of a guide position whereat said infeed guide is positioned to maintain the overlapping perforated edge portions of both the leftmost and rightmost continuous form papers engaged by a plurality of said centrally located drive pins of said infeed bars.

2. The conversion kit of claim 1 wherein said means for locking said infeed left and right bar ends to the left and right side infeed tractors includes left and right members attachable to said left and right ends, respectively, of each said infeed bar, each said left and right member extending from the point of attachment to said infeed bar to a position generally opposite a corresponding clamping end portion of said infeed left or right bar end, said clamping end portion being positionable to one side of the corresponding endless belt with said left or right member on the other side, and further includes means for attaching said left and right members to said infeed bar and applying a clamping force therebetween to clamp said infeed bar to the endless belts.

3. The conversion kit of claim 1 to adapt a single-feed continuous form paper press having infeed tractor endless belts with laterally inward projecting tab portions with one drive pin connected to each tab portion and having each drive pin connected thereto by a quadrilaterally shaped pin base, wherein said left and right end apertures have a generally corresponding quadrilateral shape to snuggly receive the pin base therein locked against rotation, whereby rotation of said infeed bar relative to the tab portion is prevented.

4. The conversion kit of claim 1 to adapt a single-feed continuous form paper press also having left and right side outfeed tractors to dual-feed continuous form paper operation, the position of each outfeed tractor being laterally adjustable and each outfeed tractor having a plurality of drive pins connected to an outfeed driven endless belt for projecting through a corresponding perforated left or right edge portion of a single continuous form paper, further including:

an outfeed bar for every other corresponding pair of left and right side outfeed tractor drive pins along the outfeed endless belts, each said outfeed bar being of a length sufficient to span the combined width of a leftmost continuous form paper and a rightmost continuous form paper positioned side-by-side with a perforated edge portion of one of the leftmost or rightmost continuous form papers overlaying the adjacent perforated edge portion of the other, each said outfeed bar having a left end with a left end aperture therethrough to receive the left side outfeed tractor drive pin of the corresponding pair of drive pins and a right end with a right end aperture therethrough to receive the right side outfeed tractor drive pin of the corresponding pair of drive pins, said outfeed bar being positioned transverse to the flow of the leftmost and rightmost continuous form papers with the left and right bar ends being in driving engagement with the left or right side outfeed tractor drive pin of the corresponding pair of drive pins to provide drive to said outfeed bar in the direction of paper flow, said left and right bar ends being sufficiently thin to permit the left and right side outfeed tractor drive pins to protrude outward sufficiently beyond said left and right bar ends to project through the corresponding perforated left or right edge portion of the leftmost or rightmost continuous form papers, respectively, each said outfeed bar further including a centrally located drive pin fixedly attached thereto to project through the overlapping perforated edge portions of both the leftmost and rightmost continuous form papers, whereby when said outfeed bars are installed on the press, said centrally located drive pins are in alignment with the direction of paper flow;

means for locking each said outfeed bar left end to the left side outfeed tractor with the left side outfeed tractor drive pin in position in said left end aperture;

means for locking each said outfeed bar right end to the right side outfeed tractor with the right side outfeed tractor drive pin position in said right end aperture;

an outfeed support arm having a length sufficient to span the width of the side-by-side leftmost and rightmost continuous form papers and attachable by each end to a stationary portion of the press; and an outfeed guide supportable by said outfeed support arm above said centrally located drive pins of said outfeed bars and movable into and out of a guide position whereat said outfeed guide is positioned to maintain the overlapping perforated edge portions of both the leftmost and rightmost continuous form papers engaged by a plurality of said centrally located drive pins of said outfeed bars.

5. The conversion kit of claim 4 wherein said means for locking said outfeed left and right bar ends to the left and right side outfeed tractors includes left and right members attachable to said left and right ends, respectively, of each said outfeed bar, each said left and right member extending from the point of attachment to said outfeed bar to a position generally opposite a corresponding clamping end portion of said outfeed left or right bar end, said clamping end portion being positionable to one side of the corresponding endless belt with said left or right member on the other side, and further includes means for attaching said left and right members to said outfeed bar and applying a clamping force therebetween to clamp said outfeed bar to the endless belts.

6. The conversion kit of claim 4 to adapt a single-feed continuous form paper press having outfeed tractor endless belts with laterally inward projecting tab portions with one drive pin connected to each tab portion and having each drive pin connected thereto by a quadrilaterally shaped pin base, wherein said left and right end apertures have a generally corresponding quadrilateral shape to snuggly receive the pin base therein locked against rotation, whereby rotation of said outfeed bar relative to the tab portion is prevented.

7. The conversion kit of claim 4 to adapt a single-feed continuous form paper press also having a rearwardly located main outfeed tray positioned below the outfeed tractors of the press to receive and collect single-feed continuous form paper after printed by the press, said kit further including a left or right side supplemental outfeed collection tray positionable below the outfeed tractors on the left or rightmost continuous form paper which is positioned with its perforated edge portion overlaying the adjacent perforated edge portion of the other, said supplemental collection tray being positionable rearward of the main collection tray be a sufficient distance to permit the leftmost or rightmost continuous form paper overlaying the other to separate from the other for folding on said supplemental tray uninhibited by the one of the leftmost or rightmost continuous form paper being folded on the main tray; and an outfeed paper transport guide attachable to a stationary portion of the press and positionable at the left or right side of the press at which said supplemental tray is positioned, said outfeed paper transport guide extending rearwardly from the location of the outfeed tractors to above said supplemental tray to guide the leftmost or rightmost continuous form paper which is positioned with its perforated edge portion overlaying the other after release from the corresponding left or right side outfeed tractor and said centrally located drive pins of said outfeed bars, to a release position above said supplemental tray.

8. The conversion kit of claim 7 wherein said outfeed paper transport guide includes an upper guide portion and a lower guide portion closely spaced apart to receive and guide the continuous form paper passing therebetween without permitting folding of the continuous form paper at transverse perforations without any mechanically active means for pulling the continuous form paper through said upper and lower guide portions.

9. The conversion kit of claim 8 wherein said upper and lower guide portions have a forward up-turned portion to receive the continuous form paper and a rearward down-turned portion to discharge the continuous form paper traveling therebetween.

10. The conversion kit of claim 7 wherein said supplemental tray has a width of about the width of the continuous form paper to be folded thereon, whereby access from the rearward side of the press is not blocked to the portion of the main tray on which the other continuous form paper is folded.

11. The conversion kit of claim 1 wherein each said infeed bar has a curved cross-sectional shape to provide rigidity and has a rounded, smooth exterior surface positioned for contact with the leftmost and rightmost continuous form papers.

12. A conversion kit to adapt a single-feed continuous form paper press having left and right side infeed tractors to dual-feed continuous form paper operation, the position of each infeed tractor being laterally adjustable and each infeed tractor having a plurality of drive pins connected to an infeed driven endless belt for projecting through a corresponding perforated left or right edge portion of a single continuous form paper, comprising:

a plurality of infeed bars, each said infeed bar being of a length sufficient to span the combined width of a leftmost continuous form paper and a rightmost continuous form paper positioned side-by-side, each with a perforated edge portion adjacent to the perforated edge portion of the other, each said infeed bar having a left end with a left end aperture therethrough to receive one of the left side infeed tractor drive pins and a right end with a right end aperture therethrough to receive the corresponding one of the right side infeed tractor drive pins, said infeed bar being positioned transverse to the flow of the leftmost and rightmost continuous form papers with the left and right bar ends being in driving engagement with the corresponding left or right side infeed tractor drive pin to provide drive to said infeed bar in the direction of paper flow, said left and right bar ends sufficiently thin to permit the left and right side infeed tractor drive pins to protrude outward sufficiently beyond said left and right bar ends to project through the corresponding perforated left or right edge portion of the leftmost or rightmost continuous form papers, respectively, each said infeed bar further including at least one centrally located drive pin fixedly attached thereto to project through the adjacent perforated edge portions of both the leftmost and rightmost continuous form papers, whereby when said infeed bars are installed on the press, said centrally located drive pins are in alignment with the direction of paper flow;

means for locking each said infeed bar left end to the left side infeed tractor with the left side infeed tractor drive pin in position in said left end aperture;

means for locking each said infeed bar right end to the right side infeed tractor with the right side infeed tractor drive pin in position in said right end aperture;

an infeed support arm attachable by at least one end to a stationary portion of the press and having a length sufficient to project to a position generally above said centrally located drive pins; and an infeed guide supportable by said infeed support arm above said centrally locted drive pins of said infeed bars and movable into and out of a guide position whereat said infeed guide is positioned to maintain the adjacent perforated edge portions of both the leftmost and rightmost continuous form papers engaged by a plurality of said centrally located drive pins of said infeed bars.

13. The conversion kit of claim 12 wherein said means for locking said infeed left and right bar ends to the left and right side infeed tractors includes left and right members attachable to said left and right ends, respectively, of each said infeed bar, each said left and right member extending from the point of attachment to said infeed bar to a position generally opposite a corresponding clamping end portion of said infeed left or right bar end, said clamping end portion being positionable to one side of the corresponding endless belt with said left or right member on the other side, and further includes means for attaching said left and right members to said infeed bar and applying a clamping force therebetween to clamp said infeed bar to the endless belts.

14. The conversion kit of claim 12 to adapt a single-feed continuous form paper press having infeed tractor endless belts with laterally inward projecting tab portions with one drive pin connected to each tab portion and having each drive pin connected thereto by a quadrilaterally shaped pin base, wherein said left and right end apertures have a generally corresponding quadrilateral shape to snuggly receive the pin base therein locked against rotation, whereby rotation of said infeed bar relative to the tab portion is prevented.

15. The conversion kit of claim 12 to adapt a single-feed continuous form paper press also having left and right side outfeed tractors to dual-feed continuous form paper operation, the position of each outfeed tractor being laterally adjustable and each outfeed trctor having a plurality of drive pins connected to an outfeed driven endless belt for projecting through a corresponding perforated left or right edge portion of a single continuous form paper, further including:

a plurality of outfeed bars, each said outfeed bar being of a length sufficient to span the combined width of a leftmost continuous form paper and a rightmost continuous form paper positioned side-by-side, each with a perforated edge portion adjacent to the perforated edge portion of the other, each said outfeed bar having a left end with a left end aperture therethrough to receive one of the left side outfeed tractor drive pins and a right end with a right end aperture therethrough to receive the corresponding one of the right side outfeed tractor drive pins, said outfeed bar being positioned transverse to the flow of the leftmost and rightmost continuous form papers with the left and right bar ends being in driving engagement with the corresponding left or right side outfeed tractor drive pin to provide drive to said outfeed bar in the direction of paper flow, said left and right bar ends being sufficiently thin to permit the left and right side outfeed tractor drive pins to protrude outward sufficiently beyond said left and right bar ends to project through the corresponding perforated left or right edge portion of the leftmost or rightmost continuous form papers, respectively, each said outfeed bar further including at least one centrally located drive pin fixedly attached thereto to project through the adjacent perforated edge portions of both the leftmost and rightmost continuous form papers, whereby when said outfeed bars are installed on the press, said centrally located drive pins are in alignment with the direction of paper flow;

means for locking each said outfeed bar left end to the left side outfeed tractor with the left side outfeed tractor drive pin in position in said left end aperture;

means for locking each said outfeed bar right end to the right side outfeed tractor with the right side outfeed tractor drive pin in position in said right end aperture;

an outfeed support arm attachable by at least one end to a stationary portion of the press and having a length sufficient to project to a position generally above said centrally located drive pins; and an outfeed guide supportable by said outfeed support arm above said centrally located drive pins of said outfeed bars and movable into and out of a guide position whereat said outfeed guide is positioned to maintain the adjacent perforated edge portions of both the leftmost and rightmost continuous form papers engaged by a plurality of said centrally located drive pins of said outfeed bars.

16. The conversion kit of claim 15 wherein said means for locking said outfeed left and right bar ends to the left and right side outfeed tractors includes left and right members attachable to said left and right ends, respectively, of each said outfeed bar, each said left and right member extending from the point of attachment to said outfeed bar to a position generally opposite a corresponding clamping end portion of said outfeed left or right bar end, said clamping end portion being positionable to one side of the corresponding endless belt with said left or right member on the other side, and further includes means for attaching said left and right members to said outfeed bar and applying a clamping force therebetween to clamp said outfeed bar to the endless belts.

17. The conversion kit of claim 15 to adapt a single-feed continuous form paper press having outfeed tractor endless belts with laterally inward projecting tab portions with one drive pin connected to each tab portion and having each drive pin connected thereto by a quadrilaterally shaped pin base, wherein said left and right end apertures have a generally corresponding quadrilateral shape to snuggly receive the pin base therein locked against rotation, whereby rotation of said outfeed bar relative to the tab portion is prevented.

18. The conversion kit of claim 15 to adapt a single-feed continuous form paper press also having a rearwardly located main outfeed tray positioned below the outfeed tractors of the press to receive and collect single-feed continuous form paper after printed by the press, wherein one of the leftmost or rightmost continuous form papers has its perforated edge portion overlaying the adjacent perforated edge portion of the other, said kit further including a left or right side supplemental outfeed collection tray positionable below the outfeed tractors on the left or right side of the press corresponding to the leftmost or rightmost continuous form paper which is positioned with its perforated edge portion overlaying the adjacent perforated edge portion of the other, said supplemental collection tray being positionable rearward of the main collection tray by a sufficient distance to permit the leftmost or rightmost continuous form paper overlaying the other to separate from the other for folding on said supplemental tray uninhibited by the one of the leftmost or rightmost continuous form paper being folded on the main tray; and an outfeed paper transport guide attachable to a stationary portion of the press and positionable at the left or right side of the press at which said supplemental tray is positioned, said outfeed paper transport guide extending rearwardly from the location of the outfeed tractors to above said supplemental tray to guide the leftmost or rightmost continuous form paper which is positioned with its preforated edge portion overlaying the other after release from the corresponding left or right side outfeed tractor and said centrally located drive pins of said outfeed bars, to a release position above said supplemental tray.

19. The conversion kit of claim 18 wherein said outfeed paper transport guide includes an upper guide portion and a lower guide portion closely spaced apart to receive and guide the continuous form paper passing therebetween without permitting folding of the continuous form paper at transverse perforations without any mechanically active means for pulling the continuous form paper through said upper and lower guide portions.

20. The conversion kit of claim 19 wherein said upper and lower guide portions have a forward up-turned portion to receive the continuous form paper and a rearward down-turned portion to discharge the continuous form paper traveling therebetween.

21. The conversion kit of claim 18 wherein said supplemental tray has a width of about the width of the continuous form paper to be folded thereon, whereby access from the rearward side of the press is not blocked to the portion of the main tray on which the other continuous form paper is folded.

22. The conversion kit of claim 12 wherein each said infeed bar has a curved cross-sectional shape to provide rigidity and has a rounded, smooth exterior surface positioned for contact with the leftmost and rightmost continuous form papers.

23. A conversion kit to adapt a single-feed continuous form paper press having left and right side infeed tractors to dual-feed continuous form paper operation, the position of each infeed tractor being laterally adjustable and each infeed tractor having a plurality of drive pins connected to an infeed driven endless belt for projecting through a corresponding perforated left or right edge portion of a single continuous form paper, comprising:

a plurality of infeed bars, each said infeed bar being of a length sufficient to span the combined width of a leftmost continuous form paper and a rightmost continuous form paper positioned side-by-side, each said infeed bar having a left end with a left end means for attachment to the left side infeed endless belt at the location of one of the left side infeed tractor drive pins and a right end with a right end means for attachment to the right side infeed endless belt and the location of the corresponding one of the right side infeed tractor drive pins, said infeed bar being positioned transverse to the flow of the leftmost and rightmost continuous form papers with the left and right bar ends being in driving engagement with the corresponding left or right side infeed endless belt to provide drive to said infeed bar in the direction of paper flow, said left and right bar ends being positioned to avoid interference with the left and right side infeed tractor drive pins projecting through the corresponding perforated left or right edge portion of the leftmost or rightmost continuous form papers, respectively, each said infeed bar further including centrally located drive pin means attached thereto for projecting through the other perforated edge portions of both the leftmost and rightmost continuous form papers;

means for locking each said infeed bar left end to the left side infeed endless belt;

means for locking each said infeed bar right end to the right side infeed endless belt;

an infeed support arm attachable by at least one end to a stationary portion of the press and having a length sufficient to project to a position generally above said centrally located drive pin means; and an infeed guide supportable by said infeed support arm above said centrally located drive pin means of said infeed bars and movable into and out of a guide position whereat said infeed guide is positioned to maintain the leftmost and rightmost continuous form papers engaged by said centrally located drive pin means of said infeed bars.

24. The conversion kit of claim 23 to adapt a single-feed continuous form paper press also having left and right side outfeed tractors to dual-feed continuous form paper operation, the position of each outfeed tractor being laterally adjustable and each outfeed tractor having a plurality of drive pins connected to an outfeed driven endless belt for projecting through a corresponding perforated left or right edge portion of a single continuous form paper, further including:

a plurality of outfeed bars, each said outfeed bar being of a length sufficient to span the combined width of a leftmost continuous form paper and a rightmost continuous form paper positioned side-by-side, each said outfeed bar having a left end with a left end means for attachment to the left side outfeed endless belt at the location of one of the left side outfeed tractor drive pins and a right end with a right end means for attachment to the right side outfeed endless belt at the location of the corresponding one of the right side outfeed tractor drive pins, said bar being positioned transverse to the flow of the leftmost and rightmost continuous form papers with the left and right bar ends being in driving engagement with the corresponding left or right side outfeed endless belt to provide drive to said outfeed bar in the direction of paper flow, said left and right bar ends being positioned to avoid interference with the left and right side outfeed tractor drive pins projecting through the corresponding perforated left or right edge portion of the leftmost or rightmost continuous form papers, respectively, each said outfeed bar further including a centrally located drive pin means attached thereto for projecting through the other perforated edge portions of both the leftmost and rightmost continuous form papers;

means for locking each said outfeed bar left end to the left side outfeed endless belt;

means for locking each said outfeed bar right end to the right side outfeed endless belt;

an outfeed support arm attachable by at least one end to a stationary portion of the press and having a length sufficient to project to a position generally above said centrally located drive pin means; and an outfeed guide supportable by said outfeed support arm above said centrally located drive pin means of said outfeed bars and movable into and out of a guide position whereat said outfeed guide is positioned to maintain the leftmost and rightmost continuous form papers engaged by said centrally located drive pin means of said outfeed bars.

25. A method for converting a single-feed continuous form paper press having left and right side infeed tractors to dual-feed continuous form paper operation, for a press in which the position of each infeed tractor is laterally adjustable and each infeed tractor has a plurality of drive pins connected to an infeed driven endless belt for projecting through a corresponding perforated left or right edge portion of a single continuous form paper, the method comprising:

providing a plurality of infeed bars, each with a length sufficient to span the combined width of a leftmost continuous form paper, and a rightmost continuous form paper positioned side-by-side, each with a perforated edge portion adjacent to the perforated edge portion of the other, each said infeed bar having a left end with a left end aperture therethrough and a right end with a right end aperture therethrough;

positioning each said infeed bar with said left end aperture receiving therein one of the left side infeed tractor drive pins and with said right end aperture receiving the corresponding one of the right side infeed tractor drive pins so as to position said infeed bar transverse to the flow of the leftmost and rightmost continuous form papers with the left and right bar ends being in driving engagement with the corresponding left or right side infeed tractor drive pin and to provide drive to said infeed bar in the direction of paper flow, said positioning of each said infeed bar being accomplished in a manner to permit the left and right side infeed tractor drive pins to protrude outward sufficiently beyond said left and right bar ends to project through the corresponding perforated left or right edge portion of the leftmost or rightmost continuous form papers, respectively;

providing a centrally located drive pin means fixedly attached to each said infeed bar for projecting through the adjacent perforated edge portions of both the leftmost and rightmost continuous form papers;

locking each said infeed bar left end to the left side infeed tractor with the left side infeed tractor drive pin in position in said left end aperture;

locking each said infeed bar right end to the right side infeed tractor with the right side infeed tractor drive pin in position in said right end aperture;

providing an infeed support arm having a length sufficient to project to a position generally above said centrally located drive pin means;

attaching said infeed support arm by at least one end to a stationary portion of the press;

providing an infeed guide supported by said infeed support arm above said centrally located drive pin means of said infeed bars; and moving said infeed guide into and out of a guide position whereat said infeed guide is positioned to maintain the adjacent perforated edge portions of both the leftmost and rightmost continuous form papers engaged by said centrally located drive pin means of said infeed bars.

26. The method of claim 25 for converting a single-feed continuous form paper press also having left and right side outfeed tractors to dual-feed continuous form paper operation, for a press in which the position of each outfeed tractor is laterally adjustable and each outfeed tractor has a plurality of drive pins connected to an outfeed driven endless belt for projecting through a corresponding perforated left or right edge portion of a single continuous form paper, the method further including:

providing a plurality of outfeed bars, each with a length sufficient to span the combined width of a leftmost continuous form paper and a rightmost continuous form paper positioned side-by-side each with a perforated edge portion adjacent to the perforated edge portion of the other, each said outfeed bar having a left end with a left end aperture therethrough and a right end with a right end aperture therethrough;

positioning each said outfeed bar with said left end aperture receiving therein one of the left side outfeed tractor drive pins and with said right end aperture receiving the corresponding one of the right side outfeed tractor drive pins so as to position said outfeed bar transverse to the flow of the leftmost and rightmost continuous form papers with the left and right bar ends being in driving engagement with the corresponding left or right side outfeed tractor drive pin and to provide drive to said outfeed bar in the direction of paper flow, said positioning of each said outfeed bar being accomplished in a manner to permit the left and right side outfeed tractor drive pins to protrude outward sufficiently beyond said left and right bar ends to project through the corresponding perforated left or right edge portion of the leftmost or rightmost continuous form papers, respectively;

providing a centrally located drive pin means fixedly attached to each said outfeed bar for projecting through the adjacent perforated edge portions of both the leftmost and rightmost continuous form papers;

locking each said outfeed bar left end to the left side outfeed tractor with the left side outfeed tractor drive pin in position in said left end aperture;

locking each said outfeed bar right end to the right side outfeed tractor with the right side outfeed tractor drive pin in position in said right end aperture;

providing an outfeed support arm and having a length sufficient to project to a position generally above said centrally located drive pin means;

attaching said outfeed support arm by at least one end to a stationary portion of the press;

providing an outfeed guide supported by said outfeed support arm above said centrally located drive pin means of said outfeed bars; and moving said outfeed guide into and out of a guide position whereat said outfeed guide is positioned to maintain the adjacent perforated edge portions of both the leftmost and rightmost continuous form papers engaged by said centrally located drive pin means of said outfeed bars.

27. The method of claim 26 for converting a single-feed continuous form paper press also having a rearwardly located main outfeed tray positioned below the outfeed tractors of the press to receive and collect single-feed continuous form paper after printed by the press, the method further including:

positioning one of the leftmost or rightmost continuous form papers with its perforated edge portion overlaying the adjacent perforated edge portion of the other, providing a supplemental outfeed collection tray;

positioning said supplemental tray below the outfeed tractors on the left or right side of the press corresponding to the leftmost or rightmost continuous form paper which is positioned with its perforated edge portion overlaying the adjacent perforated edge portion of the other, and rearward of the main collection tray by a sufficient distance to permit the leftmost or rightmost continuous form paper to separate from the other for folding on said supplemental tray uninhibited by the one of the leftmost or rightmost continuous form paper being folded on the main tray;

providing an outfeed paper transport guide;

attaching said outfeed paper transport guide to a stationary portion of the press positioned at the left or right side of the press at which said supplemental tray is positioned; and positioning said outfeed paper transport guide to extend rearwardly from the location of the outfeed tractors to above said supplemental tray to guide the leftmost or rightmost continuous form paper to be folded on said supplemental tray after release from the corresponding left or right side outfeed tractor and said centrally located drive pins of said outfeed bars, to a release position above said supplemental tray.

28. The method of claim 27 further including providing said outfeed paper transport guide with an upper guide portion and a lower guide portion and closely spacing said upper and lower guide portions apart to receive and guide the continuous form paper passing therebetween without permitting folding of the continuous form paper at transverse perforations without any mechanically active means for pulling the continuous form paper through said upper and lower guide portions.

* * * * *

UNITED STATES PATENT AND TRADEMARK OFFICE

CERTIFICATE OF CORRECTION

PATENT NO. : 4,771,921

DATED : September 20, 1988

INVENTOR(S) : Bernard A. Pearson et al

It is certified that error appears in the above-identified patent and that said Letters Patent is hereby corrected as shown below:

Claim 4, column 11, line 12, insert the word --in-- following "pin", and before "position".

Claim 7, line 57, following "or" insert --right side of the press corresponding to the leftmost or--.

Claim 7, line 61, delete "be" and substitute therefor --by--.

Claim 12, column 12, line 63, insert --being-- following "ends".

Claim 12, column 13, line 22, delete "locted" and substitute therefor --located--.

Claim 15, line 57, delete "trctor" and substitute therefor --tractor--.

Claim 24, line 66, insert --outfeed-- following "said".

Claim 27, line 28, delete "," and substitute therefor --;--.

Signed and Sealed this

Twenty-eighth Day of February, 1989

*Attest:*

DONALD J. QUIGG

*Attesting Officer*

*Commissioner of Patents and Trademarks*